(No Model.)
W. P. HAMMON & C. J. SECHRIST.
FRUIT DRYING TRAY.
No. 441,871. Patented Dec. 2, 1890.
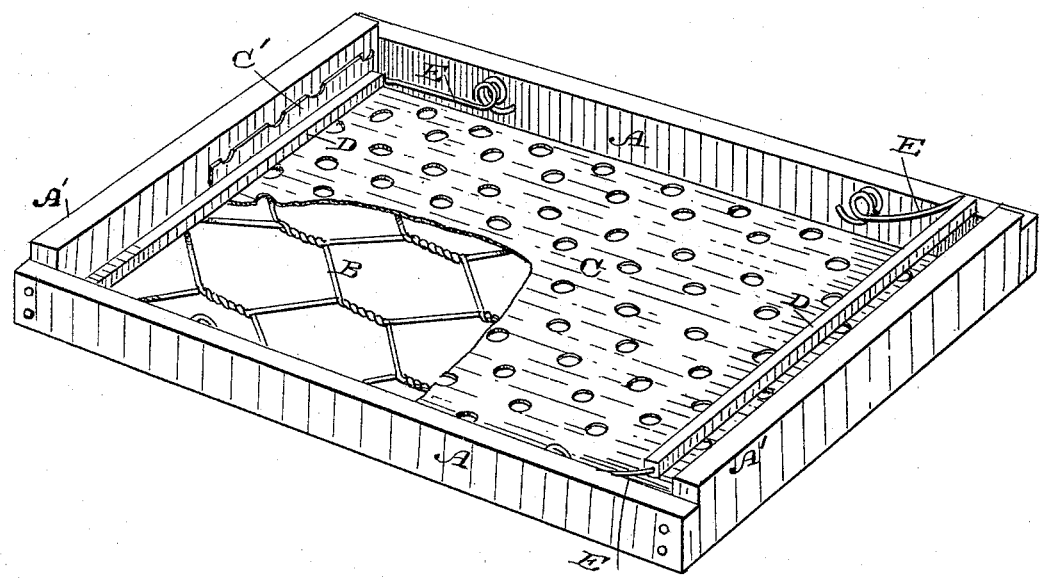
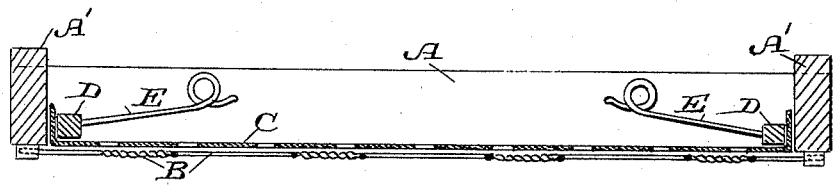
Witnesses,
J. H. Touse
H. C. Lee
Inventors,
Wendell P. Hammon
Charles J. Sechrist
By Dewey & Co.
Attys

UNITED STATES PATENT OFFICE.

WENDELL P. HAMMON, OF OAKLAND, AND CHARLES J. SECHRIST, OF SAN FRANCISCO, CALIFORNIA.

FRUIT-DRYING TRAY.

SPECIFICATION forming part of Letters Patent No. 441,871, dated December 2, 1890.

Application filed September 5, 1890. Serial No. 364,074. (No model.)

*To all whom it may concern:*

Be it known that we, WENDELL P. HAMMON, a citizen of the United States, residing at Oakland, Alameda county, State of California, and CHARLES J. SECHRIST, a citizen of the United States, residing in the city and county of San Francisco, State of California, have invented an Improvement in Fruit-Drying Trays; and we hereby declare the following to be a full, clear, and exact description of the same.

Our invention relates to a tray for the purpose of drying fruits.

It consists in certain improvements in the construction of the tray, which will be more fully described by reference to the accompanying drawings.

Figure 1 is a perspective view of the tray, showing a part of the perforated bottom broken away to expose the supporting network beneath, and showing one of the holding-clamps turned up so as to release the bottom. Fig. 2 is a longitudinal vertical section of the tray.

In the construction of our improved tray we make the sides and ends A of wood or suitable material of any desired or suitable depth, and across the bottom of this frame A is stretched and fastened a wire-screen cloth B, having a sufficiently coarse mesh, as shown. Upon the surface of this screen is supported a thin perforated bottom C, which is preferably made of stout manila or other paper, said bottom being slightly longer than the interior of the tray-frame, so that the ends may be turned up a little against the inner ends of the frame A, as shown at C'.

D D are bars extending across the inner ends of the trays so as to rest upon the ends of the paper bottom, and these bars are preferably attached to the elastic arms E, which are fixed in each of the sides of the tray so as to press upon the bars D and force them down upon the ends of the paper bottom, thus holding the bottom firmly in place.

It will be manifest that the bottom may be made of any thin flexible cheap material; but we have found that stout brown paper stretched over a two-inch wire mesh would support at the rate of fifty pounds of fruit to the tray without being injuriously depressed by the weight. The perforations made through the paper allow a free circulation of air, so that the fruit will be dried both from top and bottom simultaneously, and the work will be rapidly completed.

Whenever it is desired to remove the bottoms or to replace them with new ones when they become soiled, it is only necessary to lift up the spring-actuated bars D, which press upon the ends of the bottom, and thus release it, so that it may be removed.

It will be manifest that any suitable open-work netting or support may be used in place of wire, and any suitable light cheap fibrous material may be used for the drying-surface without materially altering the results.

The ends of the frame A are made slightly higher than the sides, as shown at A', so as to provide air-spaces above each tray when piled one upon another, and to insure a free circulation and ventilation.

Having thus described our invention, what we claim as new, and desire to secure by Letters Patent, is—

1. A fruit-drying tray consisting of the frame having the perforated paper bottom stretched across it, and a spring-actuated bar for holding said bottom in place, substantially as herein described.

2. A fruit-drying tray consisting of the wooden sides, the wire screen stretched and fixed across the bottom, the perforated paper bottom resting upon the wire screen, and the spring-actuated arms adapted to press upon said bottom and retain it in place or release it when lifted, substantially as herein described.

3. A drying-tray consisting of a frame the ends of which project above the sides, a netting stretched across the bottom of said frame, a fibrous bottom supported upon the netting, the bars D at the ends of the trays, and elastic arms connected with said bars for holding the bottom in place, substantially as herein described.

In witness whereof we have hereunto set our hands.

WENDELL P. HAMMON.
CHAS. J. SECHRIST.

Witnesses:
S. H. NOURSE,
H. C. LEE.